US012714894B2

(12) United States Patent
Chaudoy et al.

(10) Patent No.: US 12,714,894 B2
(45) Date of Patent: Aug. 25, 2026

(54) HOT-MELT CAP

(71) Applicant: RENAULT S.A.S, Boulogne Billancourt (FR)

(72) Inventors: Victor Chaudoy, Guyancourt Cedex (FR); Thierry Tourret, Guyancourt Cedex (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 313 days.

(21) Appl. No.: 18/256,825

(22) PCT Filed: Dec. 10, 2021

(86) PCT No.: PCT/EP2021/085309
§ 371 (c)(1),
(2) Date: Jun. 9, 2023

(87) PCT Pub. No.: WO2022/128824
PCT Pub. Date: Jun. 23, 2022

(65) Prior Publication Data

US 2024/0024713 A1 Jan. 25, 2024

(30) Foreign Application Priority Data

Dec. 18, 2020 (FR) ...................................... 20 13721

(51) Int. Cl.
*A62C 3/07* (2006.01)
*A62C 35/10* (2006.01)
*A62C 37/12* (2006.01)

(52) U.S. Cl.
CPC ................ *A62C 3/07* (2013.01); *A62C 35/10* (2013.01); *A62C 37/12* (2013.01)

(58) Field of Classification Search
CPC ........... A62C 3/07; A62C 13/62; A62C 13/64; A62C 35/10; A62C 37/11
(Continued)

(56) References Cited

U.S. PATENT DOCUMENTS 2,649,752 A * 8/1953 Showstack ............. G08B 17/04 116/DIG. 44
3,762,479 A * 10/1973 Fike, Sr. .............. A62C 35/605 169/65
(Continued)

FOREIGN PATENT DOCUMENTS

CN 210873875 U 6/2020
CN 111450448 A 7/2020
(Continued)

OTHER PUBLICATIONS

International Search Report issued Apr. 4, 2022 in PCT/EP2021/085309, filed on Dec. 10, 2021, 2 pages.
(Continued)

*Primary Examiner* — Cody J Lieuwen
(74) *Attorney, Agent, or Firm* — Oblon, McClelland, Maier & Neustadt, L.L.P.

(57) ABSTRACT

A device is for extinguishing a fire inside an electric storage device of a vehicle. The extinguishing device includes at least one cap and a cylinder containing at least one gas for extinguishing the fire. The cylinder includes a closing seal and defines a space containing the gas. The cap includes at least one puncturing device and a base provided with an apertured wall. The puncturing device is capable of breaking the closing seal of the cylinder whilst maintaining its air-tightness.

10 Claims, 4 Drawing Sheets

(58) Field of Classification Search
USPC ........................................................ 169/62
See application file for complete search history.

(56) References Cited

U.S. PATENT DOCUMENTS

| | | | | |
|---|---|---|---|---|
| 3,915,236 | A * | 10/1975 | Stichling | A62C 35/605 200/61.08 |
| 5,551,517 | A * | 9/1996 | Arsenault | A62C 37/12 169/57 |
| 6,021,852 | A * | 2/2000 | Barnett | A62C 13/62 169/58 |
| 2017/0036048 | A1 * | 2/2017 | Klug | A62C 37/11 |
| 2019/0319234 | A1 * | 10/2019 | Cordani | H01M 10/66 |
| 2020/0047015 | A1 * | 2/2020 | Baek | A62C 13/00 |
| 2020/0230453 | A1 * | 7/2020 | Sova | A62C 37/11 |

FOREIGN PATENT DOCUMENTS

| | | | |
|---|---|---|---|
| EP | 2 556 857 | A1 | 2/2013 |
| RU | 201 341 | U1 | 12/2020 |

OTHER PUBLICATIONS

French Preliminary Search Report issued Sep. 3, 2021 in FR Application 2013721, filed on Dec. 18, 2020, 3 pages (with English Translation of Catogires of Cited Documents).
Office Action issued Sep. 30, 2025 in Chinese Patent Application No. 202180085794.4, with English translation.

* cited by examiner

HOT-MELT CAP

BACKGROUND

The present invention relates to a fire extinguishing device and more particularly to a device for extinguishing a fire within a vehicle electrical storage device.

Electrical storage devices, otherwise known as batteries, are commonly used within hybrid and/or electric vehicles. Such storage devices are able for example to supply electrical power to an electric motor carried onboard the motor vehicle. However, the batteries may potentially catch fire, for example in the event of a vehicle fire, byway of example if the vehicle is vandalized or following a road traffic accident. The phenomenon of thermal runaway of the electrochemical cells present within the battery may therefore potentially be triggered because of the presence of a very significant release of heat in the vicinity of the batteries, for example in a vehicle fire.

The use of devices for extinguishing a fire that spreads within the electrical storage device is thus known and comprises at least a bottle filled with at least a gas able to halt the spread of the fire. In particular, document EP2556857A1 discloses a bottle of gas a sealing membrane of which is pierced by means of a needle, the needle being actuated under the effect of the melting of a heat-sensitive member that restrains it.

BRIEF SUMMARY

One of the disadvantages with such an extinguishing device mentioned hereinabove lies notably in the fact that it is expensive to implement and requires regular servicing and maintenance. It is the object of the present invention therefore to simplify the use of extinguishing devices by rendering their actuation, which is to say the release of the gas able to halt the spread of the fire, purely mechanical and by reducing the number of parts required for this actuation.

The invention therefore relates to an extinguishing device for extinguishing a fire in an electrical storage device of a vehicle, the extinguishing device comprising at least a cap and a bottle containing at least a fire-extinguishing gas, the bottle having a sealing membrane and delimiting a volume containing the gas, the cap comprising at least one piercing device, the extinguishing device being characterized in that the piercing device is made from an at least partially hot-melt material, the cap being able to be secured to the bottle so that the piercing device ruptures the sealing membrane of said bottle and so that the cap hermetically seals the volume of the bottle The device for extinguishing the fire within the electrical storage device, or in other words the batteries, can be used with an electric and/or hybrid motor vehicle but can also be used in a stationary storage facility. Such batteries are notably able to supply electrical power to an electric motor housed within the vehicle, thus allowing the vehicle to move along. The extinguishing device therefore has the purpose of combating the spread of a fire within the electrical storage device. To do that, the extinguishing device comprises at least the bottle of gas and the cap which is able to hermetically seal the volume of the bottle while at the same time allowing the gas to exit under the effect of at least one environmental parameter, in this instance the temperature of the air in the electrical storage device.

It will therefore be appreciated that the piercing device of the cap is able, on the one hand, to rupture the sealing membrane, releasing the gas contained in the volume of the bottle, and, on the other hand, to block the discharging of this gas out of the bottle, which is to say toward the exterior environment of said volume. Such hermetic sealing of the volume of the bottle is therefore provided at least in part by the piercing device.

According to one feature of the invention, the piercing device comprises at least a body and a spike both containing a hot-melt material.

It will be appreciated here that the spike has the function of rupturing the sealing membrane of the gas bottle and is configured to extend at least in part into the volume of the bottle once the sealing membrane has been ruptured. It will moreover be appreciated that the spike, when it extends into the volume of the bottle, contributes to sealing the volume of said bottle, in combination with the body.

What is therefore meant by a hot-melt material is that said material is sensitive to heat. Stated differently, the hot-melt material is able to change state under the effect of heat and notably to transition from the solid state to the liquid state. In other words, the piercing device is able to melt under the effect of heat, at least upwards of a threshold temperature, for example 80° C.

According to nonlimiting examples of the invention, the body and the spike may be made from polyethylene, and/or from polypropylene, and/or from polyamide and/or from polybutylene terephthalate and/or from polyacrylonitrile butadiene styrene.

According to one feature of the invention, the cap comprises a base provided with a perforated wall able to allow the gas to pass, the base containing at least a heat-resistant material, the perforated wall being positioned around the body of the piercing device and the base comprising at least one fixing means for fixing the cap to the bottle.

The base of the cap therefore contributes to holding the piercing device in position on the bottle so that this piercing device hermetically seals said bottle. What is meant by a heat-resistant material is the fact that the base is able to withstand high temperatures, notably higher than the melting point temperature of the hot-melt material of which the piercing device is made. Stated differently, the base has a melting point temperature for example higher than 250° C. According to one example of the invention, the entirety of the base is made from the heat-resistant material.

According to some nonlimiting examples of the invention, the heat-resistant material may be a synthetic material of the polyetheretherketone and/or polyimide and/or epoxy type.

What is meant by a perforated wall is that this wall comprises at least one aperture formed in its thickness, so as to place an internal volume of the base in communication with the external environment thereof. It will thus be appreciated that, once at least part of the piercing device has melted, the perforated wall allows the gas to pass from the volume of the bottle into the external environment of the bottle. According to one example of the invention, the wall may comprise a plurality of apertures extending peripherally around the base.

According to one exemplary embodiment of the invention, the fixing means extends around the periphery of the spike of the piercing device.

According to one feature of the invention, the base comprises at least one fixing wall arranged around the spike of the piercing device, the fixing means belonging to the cap being a screw thread formed on the fixing wall and able to collaborate with a complementary screw thread formed on the bottle.

The perforated wall is extended by a fixing wall which comprises the fixing means, in this instance the screw thread, for example an internal or external thread. According to one example, the fixing wall comprises an internal face, facing toward the spike of the piercing device, the internal screw thread being formed on said internal face of the fixing wall.

The bottle comprises an opening intended to be covered by the sealing membrane before the cap is mounted on the bottle, the opening notably being produced at the end of a neck of the bottle. It will therefore be appreciated that the complementary screw thread is formed on an external periphery of the neck of the bottle so that it is able to collaborate with the screw thread of the fixing wall of the base of the cap.

It will therefore be appreciated that, in this exemplary embodiment of the invention, the cap is screwed onto the bottle so that the spike ruptures the sealing membrane, the fact that the cap is held on the bottle by means of the screw thread and of the complementary screw thread ensuring hermetic sealing of the volume of the body, in combination with the piercing device.

According to an alternative embodiment of the invention, the fixing means for fixing the cap to the bottle is a force-fitting of the base onto the bottle According to one example of the invention, the internal face of the fixing wall may comprise an additional thickness which extends peripherally around the spike of the piercing device, the additional thickness contributing to holding the cap on the bottle. Stated differently, the additional thickness contributes to reducing a perimeter defined by the fixing wall, thus contributing to the force-fitting of the cap onto the bottle.

According to one feature of the invention, a sealing gasket is arranged peripherally around the spike of the piercing device.

It will be appreciated that the sealing gasket increases the hermetic tightness of the sealing of the volume of the bottle by the cap, notably when said cap is force-fitted onto the bottle.

According to one feature of the invention, the piercing device contains at least 5% of a mineral material.

The mineral material that at least partially constitutes the piercing device makes it possible to increase the hardness of the piercing device. The ability of the piercing device to rupture the sealing membrane is thus enhanced, without adverse impact on its hot-melt property.

According to one feature of the invention, the gas bottle at least partially contains carbon dioxide. Carbon dioxide has the notable property of being able to extinguish a fire spreading within the electrical storage device, notably by expelling at least some of the oxygen present in the electrical storage device.

According to one feature of the invention, the piercing device has a melting point temperature at least higher than 80° C. It will be appreciated that, upward of 80° C., the piercing device will transition from the solid state to the liquid state, thus allowing the gas to pass from the volume of the bottle toward the external environment thereof, notably by means of the perforated wall of the base. According to one example, the melting point temperature of the piercing device is higher than 80° C. Advantageously, the melting point temperature of the piercing device is below 120° C.

The invention also relates to an electrical storage device for a motor vehicle comprising at least a peripheral wall and at least one fire extinguishing device in accordance with the preceding features.

The electrical storage device, otherwise known as battery pack, is notably used within vehicles referred to as hybrid or all electric, so as to supply electricity to at least one electric motor. The peripheral wall therefore contributes to delimiting a space in which the storage cells that make up the electrical storage device are housed.

According to one feature of the electrical storage device, the extinguishing device is housed in the peripheral wall. More specifically, at least one cavity is formed in a thickness of the peripheral wall of the electrical storage device, the extinguishing device being housed in said cavity.

According to one example, this cavity opens onto one edge of the peripheral wall.

According to one feature of the storage device, the peripheral wall comprises at least one cutout, the cap comprising a base provided with a perforated wall able to allow the gas to pass, the perforated wall of the base of the cap of the extinguishing device being positioned facing the cutout.

It will be appreciated that the cutout is made at the cavity that houses the extinguishing device, so that the cutout is formed facing the perforated wall of the cap. In other words, the cutout places a volume of the cavity in communication with an internal space of the electrical storage device in which the electrical cells are positioned. Such a feature is put to good use in that it makes it possible to increase the diffusion of gas from the gas bottle toward the internal space of the electrical storage device.

The invention moreover relates to a method for assembling the extinguishing device in accordance with the preceding features, the method comprising at least a step during which the cap is positioned facing the sealed sealing membrane of the bottle, and then, in at least one later step, the cap is fixed onto the bottle by a fixing means so that the piercing device ruptures the sealing membrane, the cap then hermetically sealing the volume of the bottle.

It will therefore be appreciated that the combination of the structure of the piercing device and of the retention of the cap by its fixing means ensures hermetic sealing of the gas bottle. It will also be appreciated that the melting of the piercing device, which contains a hot-melt material, ensures that the gas passes from the volume of the bottle to a volume external to the bottom, in this instance the internal space of the electrical storage device, allowing the fire to be extinguished.

BRIEF DESCRIPTION OF THE DRAWINGS

Further features, details and advantages of the invention will become more clearly apparent from reading the description given hereafter by way of indication in connection with the drawings in which.

DETAILED DESCRIPTION

It should first of all be noted that while the figures explain the invention in detail in terms of implementation thereof, these figures may of course serve the better to define the invention, where applicable. It should also be noted that these figures explain only exemplary embodiments of the invention. Finally, the same references refer to the same elements throughout all the figures.

Figure 1:
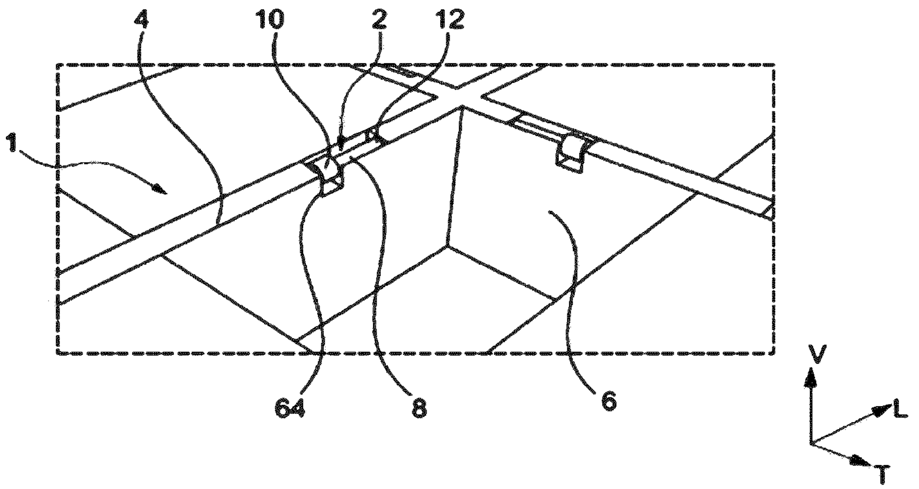
FIG. 1 is a general arrangement of an electrical storage device comprising an extinguishing device according to the invention.

FIG. 1 illustrates an electrical storage device 1, for example of a motor vehicle, in which an extinguishing device 2 according to the invention is housed. The storage device 1, otherwise known as a battery pack, may notably be used within a hybrid or electric motor vehicle for which vehicles it supplies electrical power to at least one electric motor, not depicted, such a motor allowing the vehicle to move.

The electrical storage device 1 comprises at least a peripheral wall 4 which delimits a space 6 of said storage device, the space 6 being able to house, for example, electric cells, not depicted. As visible in FIG. 1, the peripheral wall 4 of the electrical storage device 1 comprises at least one cavity 8 formed in its thickness, the extinguishing device 2 according to the invention being housed in said cavity 8.

The extinguishing device 2 has the function of at least preventing the spread of fire within the electrical storage device 1, notably by releasing at least one fire extinguishing gas. More specifically, the gas may for example at least be carbon dioxide which is able to limit the spread of the fire by filling the space 6 of the electrical storage device 1, thus diminishing the amount of oxidant available to the fire.

Figure 2:
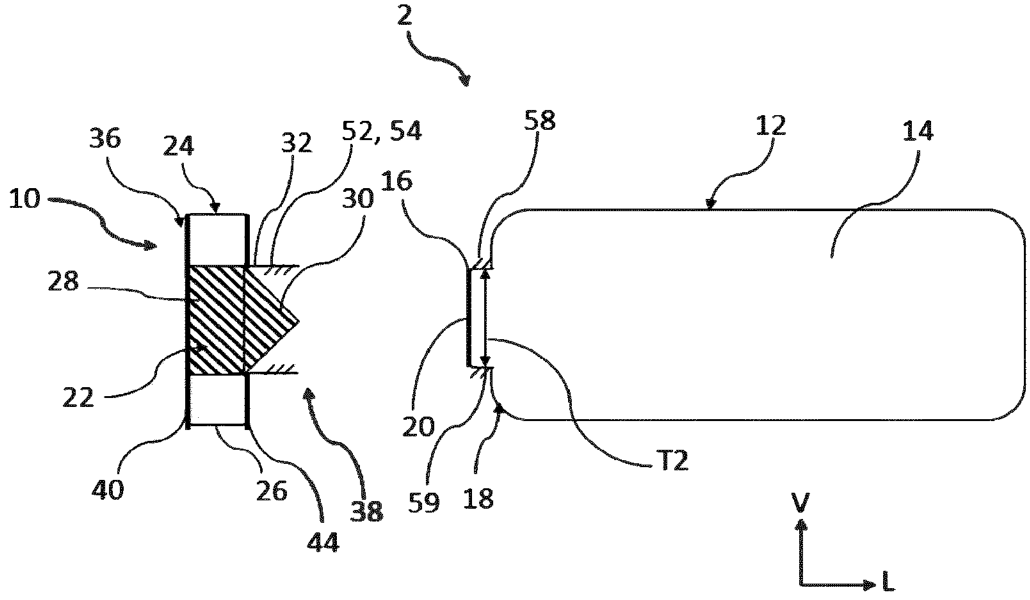
FIG. 2 is a schematic view of the extinguishing device of FIG. 1 comprising at least a cap and a gas bottle.

The extinguishing device 2 visible in FIG. 2 in a pre-assembly configuration comprises at least a cap 10 and a bottle 12 containing at least the fire extinguishing gas. More specifically, the bottle 12 of said extinguishing device 2 delimits a volume 14 in which the gas is contained. The gas bottle 12 extends mainly in a longitudinal direction L and comprises at least one opening 16 at one of its longitudinal ends 18. It will therefore be appreciated that the opening 16 is intended, on the one hand, to allow the gas to enter the volume 14 of the bottle 12 and, on the other hand, said gas to exit, notably when the extinguishing device 2 is housed in the electrical storage device, under certain environmental conditions which will be detailed hereinafter.

In the configuration of FIG. 2, the volume 14 of the gas bottle 12 is closed by means of a sealing membrane 20 that covers the opening 16 of the gas bottle 12. It will therefore be appreciated that the sealing membrane 20 has the function of preventing the gas from exiting the volume 14 of the bottle 12. According to one nonlimiting example of the invention, the sealing membrane 20 is a readily tearable sheet such as aluminum or else a film of plastic coated paper.

The cap 10 of the extinguishing device 2 comprises at least one piercing device 22 and a base 24 provided with a perforated wall 26. The piercing device 22 therefore has the function on the one hand of rupturing the above-described sealing membrane 20 of the bottle 12 and on the other hand of at least partially providing hermetic sealing of the bottle 12 once the sealing membrane 20 has been ruptured, in collaboration with the base 24 of the cap 10. What is therefore meant by hermetic sealing is that the cap 10 prevents the gas in the bottle 12 from exiting the volume 14 thereof, toward the space of the electrical storage device. Such collaboration between the cap 10 and the bottle 12 will be described later on in the detailed description, notably in FIG. 6.

Figure 3:
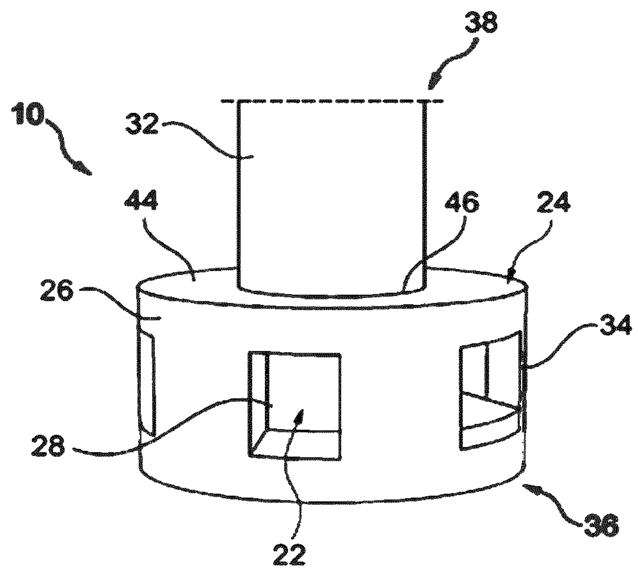
FIG. 3 is a general arrangement of the cap of the extinguishing device of FIG. 1.
Figure 4:
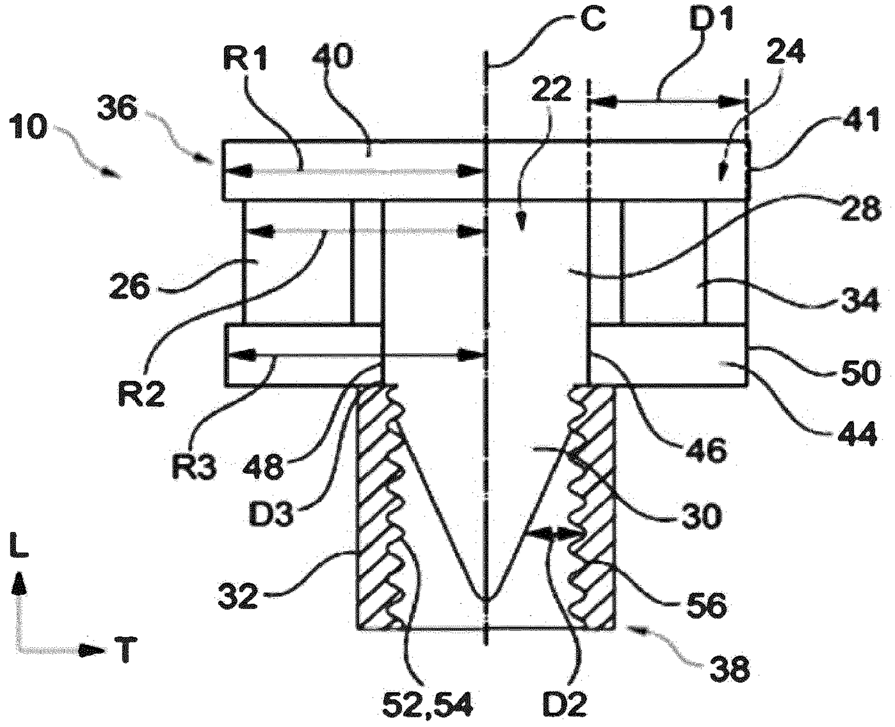
FIG. 4 is a schematic view in longitudinal section of the cap of the extinguishing device of FIG. 1, comprising at least a fixing means for fixing to the bottom according to a first exemplary embodiment.

The cap 10 will now be described in greater detail with reference to FIGS. 3 to 5.

The piercing device 22 of the cap 10 comprises at least a body 28 and a spike 30 which extends from the body 28 of the cap 10. More specifically, the spike 30 extends from the body 28 of the cap 10 in the longitudinal direction L of the gas bottle 12. It will therefore be appreciated that the piercing device 22 has a shape that is elongate in the longitudinal direction L of the bottle 12. According to the example of the invention, the body 28 of the piercing device 22 has a cylindrical shape for which there may be defined a central axis C of revolution, parallel to the longitudinal direction L of the bottle. Thus, the spike 30 has a conical shape of which one end that forms a chamfer of the cone is positioned on the central axis C of the body 28 and at the opposite end therefrom.

According to the invention, the body 28 and the spike 30 of the piercing device 22 both contain a hot-melt material. Advantageously, the body 28 and the spike 30 of the piercing device 22 are made entirely from the hot-melt material. What is meant by a hot-melt material is the fact that the body 28 and the spike 30 of the piercing device 22 are able to transition from a solid state to a liquid state under the effect of a determined temperature. Thus, the body 28 and the spike 30 are able to soften when the temperature reaches at least a threshold temperature, and then melt when the temperature reaches at least a melting point temperature. The melting point temperature beyond which the body 28 and the spike 30 melt is in this instance at least 80° C. It will therefore be appreciated that when the temperature present in the space of the electrical storage device reaches at least the melting point temperature of the body 28 and of the spike 30, these elements change state, as mentioned hereinabove.

According to nonlimiting examples of the invention, the body 28 and the spike 30 may be made from polyethylene and/or polypropylene and/or polyamide and/or from polybutylene terephthalate, and/or from polyacrylonitrile butadiene styrene.

According to one example of the invention, the body 28 and the spike 30 may contain at least 5% of a mineral material. The mineral material of which the body 28 and the spike 30 are at least partially composed then has the effect of strengthening the structure of these elements, notably hardening the same. Such a composition containing at least 5% mineral material also offers the advantage of preserving the hot-melt property of the body 28 and of the spike 30 of the piercing device 22. The stiffness obtained through the incorporation of the mineral material ensures that the sealing membrane 20 is pierced by the spike 30 when the cap 10 is assembled with the bottle 12.

The base 24 of the cap 10 comprises at least the perforated wall 26 and at least a fixing wall 32.

More specifically, the perforated wall 26 of the base 24 is positioned around the body 28 of the piercing device 22, while the fixing wall 32 is arranged around the spike 30 of said piercing device 22. It will therefore be appreciated that the perforated wall 26 of the base 24 extends around the periphery of the body 28 of the piercing device 22, chiefly in the longitudinal direction L of the bottle and such that it lies at a first non-zero distance D1 from said body 28, the first distance D1 being considered in a radial direction of the body 28 relative to the central axis C thereof, as is apparent from FIG. 4.

What is therefore meant by perforated wall 26 is the fact that this wall comprises at least one through-aperture 34. More specifically and as illustrated in this example of the invention, the perforated wall 26 comprises a plurality of apertures 34 which extend peripherally around the body 28 of the piercing device 22.

The fixing wall 32 of the base 24 extends peripherally around the spike 30 of the piercing device 22, chiefly in the longitudinal direction L of the bottle. More specifically, the fixing wall 32 extends at least partially at a second non-zero distance D2 from the spike 30, the second distance D2 being considered in the radial direction of the body 28 according to its central axis C.

Because the shape of the spike 30 is conical, it will be appreciated that the second distance D2 that separates the spike 30 from the fixing wall 32 increases with increasing distance away from the body 28 of the piercing device 22, in the longitudinal direction L of the bottle. Moreover, the second distance D2 is strictly smaller than the first distance D1 which separates the body 28 of the piercing device 22 from the perforated wall 26.

A first end 36 of the cap 10 and a second end 38 of the cap 10, which are opposite one another in the longitudinal direction L of the gas bottle, are defined. The first end 36 therefore corresponds to the end located at the level of the perforated wall 26 of the base 24, while the second end 38 corresponds to the end at the level of the fixing wall 32 of the base 24.

An end disk 40 of the base 24 is positioned at the first end 36 of the cap 10. The end disk 40 is therefore configured to close the first end 36 of the cap 10 so that the plurality of apertures 34 constitutes the only means of fluidic communication between a volume internal to the cap delimited by the perforated wall 26 and an environment external to the cap 10. The end disk 40 comprises an outer peripheral edge 41 which has an end-disk radius R1 at least equal to a wall radius R2 defined by the perforated wall 26, the end-disk external radius R1 and the wall radius R2 being defined with respect to the central axis C of the body 28 of the piercing device 22. It will therefore be appreciated that the end disk 40 is arranged so that it covers one end of the perforated wall 26, at the first end 36 of the cap 10.

It will moreover be appreciated that, in a configuration in which the temperature inside the space of the electrical storage device reaches at least the melting point temperature, the piercing device 22 melts and allows the gas to circulate toward the apertures 34.

The base 24 of the cap 10 moreover comprises at least one connecting disk 44, positioned between the perforated wall 26 and the fixing wall 32 of the base 24. Stated differently, the connecting disk 44 extends radially at the periphery of the piercing device 22, along the central axis C of the body and in such a way that it connects the perforated wall 26 to the fixing wall 32. The connecting disk 44 moreover comprises a circular orifice 46 an interior peripheral edge 48 of which extends around the body 28 of the piercing device 22. The interior peripheral edge 48 is notably fitted closely around the body 28 so that said interior peripheral edge 48 and the body 28 are in contact with one another, which is to say at a zero first distance D3, measured in the radial direction of the body 28 with respect to its central axis C. According to the illustrated example of the invention, the connecting disk 44 has a connecting-disk radius R3 measured between the central axis C and an outer edge 50 of the connecting disk 44, that is at least equal to the wall radius R2 defined hereinabove.

It will therefore be appreciated from the foregoing that the particular layout of the connecting disk 44 around the body 28 of the piercing device 22 makes it possible to block the circulation of the gas between a volume delimited by the fixing wall 32 and the volume delimited by the perforated wall 26.

According to the invention, the base 24 of the cap 10 contains at least one heat-resistant material. What is therefore meant by a heat-resistant material is the fact that the base 24 is able to withstand high temperatures, strictly higher than the melting point temperature of the piercing device 22 as explained hereinabove. More specifically, the heat-resistant material according to the invention is able to withstand a temperature at least greater than 250° C., which temperature should never be reached because the melting of the piercing device will have suffocated the fire before this happens. According to nonlimiting examples of the invention, the heat-resistant material may be a plastics material of the polyetheretherketone and/or polyimide and/or epoxy type.

According to one feature of the invention, the heat-resistant material of the base 24 of the cap 10 may contain a mineral material. The mineral material that at least partially constitutes the base 24 makes it possible to improve the mechanical properties of this base and its ability to withstand high temperatures.

Still according to the invention, the base 24 comprises at least one fixing means 52 for fixing the cap 10 to the gas bottle 12. Thus, according to a first example of the invention which is visible in FIG. 4, the fixing means 52 belonging to the cap 10 is a screw thread 54, in this instance an internal screw thread, formed on the fixing wall 32 of the base 24. More specifically, an internal face 56 of the fixing wall 32 is defined as being a face of the fixing wall 32 that faces toward the spike 30 of the piercing device 22. The internal face 56 therefore comprises at least the screw thread 54 able to collaborate with a complementary screw thread 58 formed at the opening 16 of the bottle 12, as visible in FIG. 2. The complementary screw thread 58 here is produced on an external peripheral of a neck 59 of the bottle 12.

Figure 5:
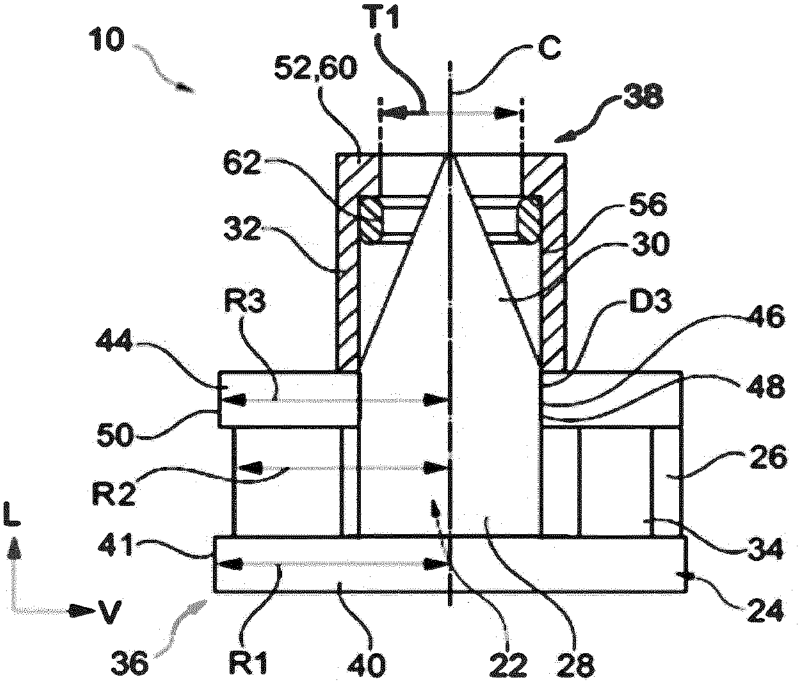
FIG. 5 is a schematic view in longitudinal section of the cap of the extinguishing device of FIG. 1 comprising at least a fixing means for fixing to the bottle according to a second exemplary embodiment.

According to a second example of the fixing means 52, visible in FIG. 5, the fixing of the cap 10 to the gas bottle 12 is a force-fitting of at least the fixing wall 32 onto the neck 59 of the bottle. It should be considered that, in the remainder of the description, only the features that differ between the second embodiment and the first embodiment, and notably the fixing means 52, will be discussed in detail. For the elements that are common to both, reference should be made to the above description.

An additional thickness 60 extends peripherally from the internal face 56 of the fixing wall 32.

More specifically, the additional thickness 60 extends from the internal face 56 at the second end 38 of the cap 10 and peripherally around the spike 30 of the piercing device 22. The additional thickness 60 therefore has the function of reducing an internal diameter T1 of the fixing wall 32 so as to allow said fixing wall 32 to be forced-fitted onto the neck 59 of the gas bottle 12, said neck 59 having a neck diameter T2, visible in FIG. 2, strictly greater than the internal diameter T1 of the fixing wall 32.

According to the example of the invention illustrated in FIG. 5, a sealing gasket 62 may be placed in the volume delimited by the fixing wall, between the additional thickness 60 thereof and the above-described connecting disk 44.

More specifically, the sealing gasket 62 extends peripherally around the spike 30 of the piercing device 22. It will therefore be appreciated that the sealing gasket 62 contributes to ensuring gastightness between the volume of the bottle and the volume delimited by the base 24, when the cap 10 is fixed on the bottle.

The method for assembling the extinguishing device 2 will now be described in greater detail by means of FIG. 6 and FIG. 7.

In an initial state in which the cap 10 and the gas bottle 12 which has been described hereinabove are separate from one another, as visible in FIG. 6, the sealing membrane 20 of said bottle 12 provides a fluidtight seal sealing the volume 14 of the bottle 12 containing the gas. The method therefore comprises at least one step during which the cap 10 is brought to face the opening 16 of the bottle 12 bearing the sealing membrane 20. More specifically, the second end 38 of the cap 10 is brought to face the opening 16 of the gas bottle 12. Thus, the spike 30 of the piercing device 22 is positioned facing the seal membrane 20 of the bottle 12.

Thereafter, in a later step, the cap 10 is fixed onto the opening 16 of the bottle 12 via the fixing means 52 formed on the fixing wall 32 of the base 24. Thus, in instances in which the fixing means 52 corresponds to the screw thread 54 formed on the internal face 56 of the fixing wall 32, the cap 10 is screwed onto the neck 59 of the bottle 12 by means of the complementary screw thread 58 formed on said neck 59. More specifically, the cap 10 is screwed onto this neck 59 at least until the spike 30 of the piercing device 22 ruptures the sealing membrane 20 placed across the opening 16 of the bottle 12.

The particular structure of the cap 10, and notably the sealing between the volume delimited by the fixing wall 32 and the volume delimited by the perforated wall 26, means that the gas bottle 12 remains sealed. In other words, even though the sealing membrane 20 of the bottle 12 has been ruptured and allows the gas to pass through the opening 16 of said bottle 12, the above-described structure of the cap 10 and the fact that the latter is held in place on the neck 59 ensures that said bottle 12 remains hermetically sealed.

According to an alternative arrangement of the extinguishing device, provision may be made for the cap to be fixed onto the bottle in such a way that the piercing device fully seals the opening of the bottle. Thus, the spike of the piercing device extends into the volume of the bottle until it encounters an edge of the bottle that delimits the opening. The hermetic sealing of the gas bottle is thus enhanced.

When the extinguishing device 2 is positioned in the cavity 8 of the electrical storage device 1 as visible in FIG. 1, the increase in temperature within the space 6 of the storage device 1 at least up to the melting point temperature has the effect of causing the piercing device 22 to melt. In that way, the change in state of the piercing device 22 from the solid state at least to the liquid state has the effect of modifying the sealing properties of the cap 10.

Figure 7:
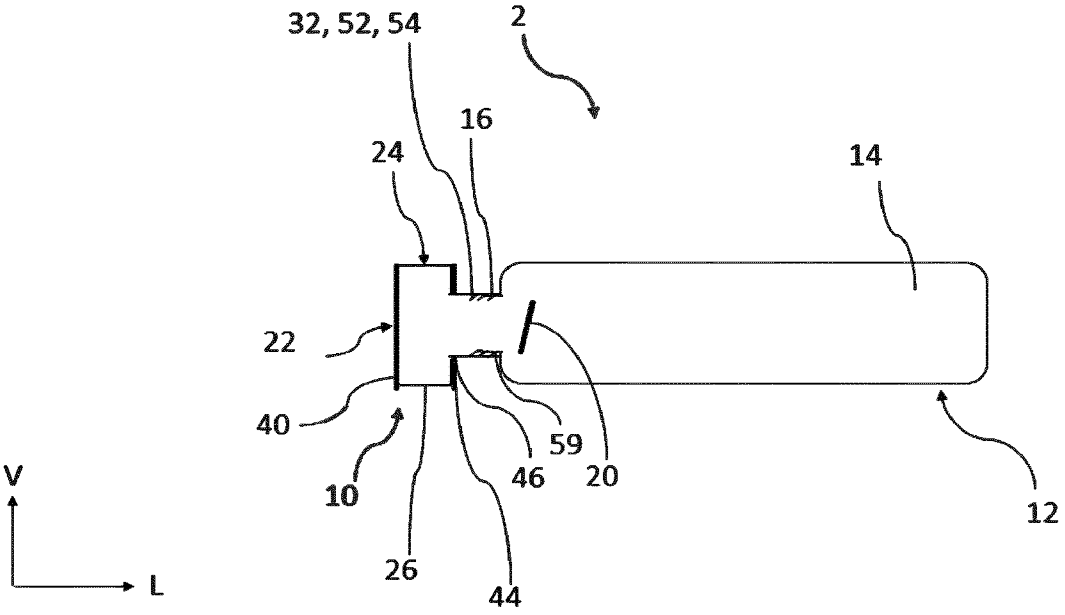
FIG. 7 is a schematic view of the extinguishing device of FIG. 1 with the piercing device in a molten state.

Stated differently, the melting of the piercing device, as visible in FIG. 7, has the effect of allowing the gas to circulate, notably at the connecting disk 44 and at the circular orifice 46 thereof. Specifically, the melting of the piercing device generates a space at least between the interior peripheral edge 48 and the piercing device 22, the space between these elements increasing as the piercing device melts further. Stated differently, the interior peripheral edge 48 of the circular orifice 46 and the piercing device 22 are no longer in contact with one another.

It will therefore be appreciated that the apertures 34 formed in the perforated wall 26 have the function of allowing the gas to diffuse out of the cap 10, having passed through the circular orifice 46 in the connecting disk 44.

According to one advantageous feature of the invention which is visible in FIG. 1, the peripheral wall 4 of the electrical storage device 1 comprises at least one cutout 64, which opens onto the cavity 8 housing the extinguishing device 2, so that the cutout 64 is formed at least partially facing the perforated wall of the base of the extinguishing device 2. This then makes it easier for the gas to diffuse from the volume of the bottle toward the space 6 of the electrical storage device 1.

Figure 6:
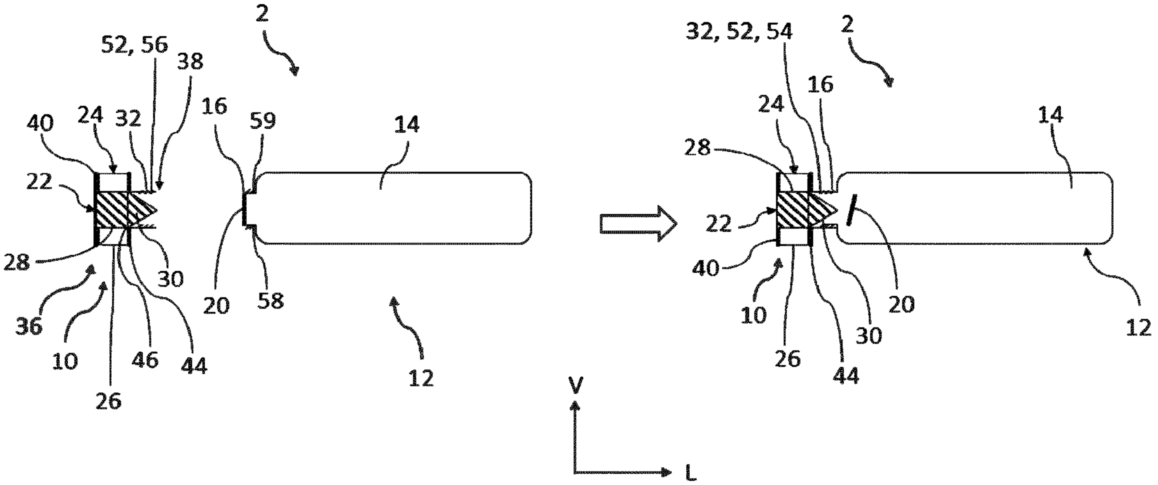
FIG. 6 is a schematic view of at least a part of the fitting of the cap of the extinguishing device of FIG. 1 onto the bottle thereof.

It will be appreciated that the assembly method and the structural and functional features pertaining to the cap 10 and which have just been described in relation to FIG. 6, FIG. 7 and FIG. 1, apply mutatis mutandis when the fixing means is the force-fitting of the cap onto the opening of the gas bottle as described in FIG. 5.

The extinguishing device as has just been described is advantageous in that it makes it possible, through means that are simple and inherent to its structure, to hermetically seal the volume of the bottle containing the gas when the storage device is under normal operating conditions, which is to say when the temperature is below the melting point temperature of the piercing device, while at the same time allowing the gas to be released into the space of said electrical storage device when the temperature exceeds the melting point temperature of the piercing device.

However, the invention must not be limited to the means and configurations exclusively described and illustrated, and also applies to any means or configurations that are equivalent and to any combination of such means or configurations.

The invention claimed is:

1. An extinguishing device for extinguishing a fire in an electrical storage device of a vehicle, the extinguishing device comprising:

- a cap and a bottle containing at least a fire-extinguishing gas, the bottle having a sealing membrane and delimiting a volume containing the gas, the cap comprising at least one piercing device,
- wherein the piercing device is made from an at least partially hot-melt material, the piercing device comprising at least a body and a spike both containing a hot-melt material and
- wherein the cap is configured to be secured to the bottle so that the 2 spike ruptures the sealing membrane of said bottle and so that the hot-melt material of the piercing device hermetically seals the gas within the volume of the bottle after the piercing device ruptures the sealing membrane.

2. The extinguishing device as claimed in claim 1, wherein the cap comprises a base provided with a perforated wall configured to allow the gas to pass, the base containing at least a heat-resistant material, the perforated wall being positioned around the body of the piercing device and the base comprising at least one fixing means for fixing the cap to the bottle.

3. The extinguishing device as claimed in claim 2, wherein the base comprises at least one fixing wall arranged around the spike of the piercing device, the fixing means belonging to the cap being a screw thread formed on the fixing wall and configured to collaborate with a complementary screw thread formed on the bottle.

4. The extinguishing device as claimed in claim 2, wherein the fixing means for fixing the cap to the bottle is a force-fitting of the base onto the bottle.

5. The extinguishing device as claimed in claim 1, wherein the piercing device contains at least 5% of a mineral material.

6. The extinguishing device as claimed in claim 1, wherein the spike is positioned, when the cap is attached to the body, to extend into the bottle.

7. An electrical storage device for a motor vehicle comprising:

at least a peripheral wall and at least one of the extinguishing device as claimed in claim 1.

8. The electrical storage device as claimed in claim 7, wherein the extinguishing device is housed in the peripheral wall.

9. The electrical storage device as claimed in claim 7, wherein the peripheral wall comprises at least one cutout, the cap comprising a base provided with a perforated wall configured to allow the gas to pass, the perforated wall of the base of the cap of the extinguishing device being positioned facing the cutout.

10. A method for assembling the extinguishing device as claimed in claim 1, the method comprising:

positioning the cap facing the sealed sealing membrane of the bottle, and then fixing the cap onto the bottle by a fixing means so that the piercing device ruptures the sealing membrane, the cap then hermetically sealing the volume of the bottle.

* * * * *